United States Patent
Koga

(10) Patent No.: US 9,268,253 B2
(45) Date of Patent: Feb. 23, 2016

(54) IMAGE FORMING APPARATUS WITH LIGHT AMOUNT CONTROL

(71) Applicant: CANON KABUSHIKI KAISHA, Tokyo (JP)

(72) Inventor: Katsuhide Koga, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/716,417

(22) Filed: May 19, 2015

(65) Prior Publication Data

US 2015/0338767 A1    Nov. 26, 2015

(30) Foreign Application Priority Data

May 23, 2014   (JP) ................................ 2014-107037

(51) Int. Cl.
*G03G 15/00* (2006.01)
*G03G 15/043* (2006.01)
*G02B 26/10* (2006.01)

(52) U.S. Cl.
CPC .............. *G03G 15/043* (2013.01); *G02B 26/10* (2013.01)

(58) Field of Classification Search
USPC .......... 399/1–4, 38, 44, 51, 52, 177, 220, 221
See application file for complete search history.

(56) References Cited

U.S. PATENT DOCUMENTS

| 4,835,780 | A | 5/1989 | Sugimura | |
|---|---|---|---|---|
| 6,549,265 | B1 * | 4/2003 | Sakakibara | .......... H04N 1/4005 347/224 |
| 2005/0205769 | A1 * | 9/2005 | Ishikawa | ............ G06K 15/1214 250/234 |
| 2009/0190617 | A1 * | 7/2009 | Kikuchi | ................ H01S 5/0683 372/29.021 |
| 2011/0241571 | A1 * | 10/2011 | Maeda | .................... H01S 5/042 315/307 |

FOREIGN PATENT DOCUMENTS

| JP | 2004-223716 A | 8/2004 |
|---|---|---|
| JP | 2012-40779 A | 3/2013 |
| JP | 2014-111354 A | 6/2014 |
| WO | WO2013/161258 A1 | 10/2013 |

* cited by examiner

*Primary Examiner* — Hoan Tran
(74) *Attorney, Agent, or Firm* — Canon USA, Inc., IP Division

(57) ABSTRACT

A droop characteristic or an inverse droop characteristic may fail to be sufficiently corrected depending on the temperature of a semiconductor laser. An image forming apparatus includes a droop correction unit configured to supply a correction current of which an attenuation tendency or a gradual increase tendency changes according to data about the temperature.

8 Claims, 8 Drawing Sheets

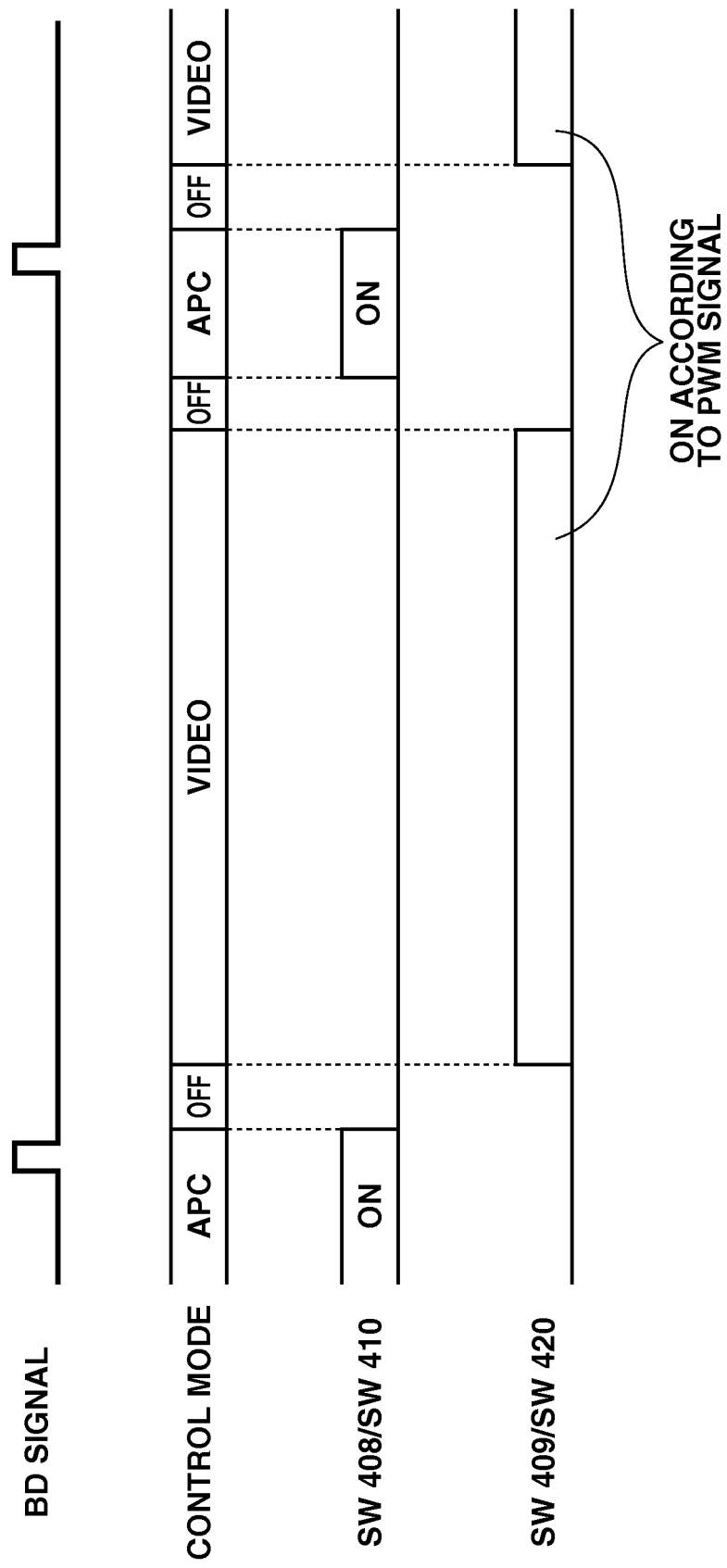

IMAGE FORMING APPARATUS WITH LIGHT AMOUNT CONTROL

BACKGROUND OF THE INVENTION

1. Field of the Invention

The present invention relates to correction of light amount variations of a light source in an electrophotographic image forming apparatus.

2. Description of the Related Art

An electrophotographic image forming apparatus performs light amount control (automatic power control; hereinafter, referred to as APC control) to stabilize the light amount of laser light (light beam) emitted from a semiconductor laser to expose a photosensitive member. For example, Japanese Patent Application Laid-Open No. 2004-223716 discusses the foregoing APC control. In an image forming apparatus discussed in Japanese Patent Application Laid-Open No. 2004-223716, a light receiving element (photoelectric conversion element) receives laser light in each scanning cycle of the laser light. The value of a current supplied to the semiconductor laser is controlled so that the amount of light that is incident on the light receiving element coincides with a target light amount.

FIG. 7 is a chart illustrating a light emission characteristic of a semiconductor laser (relationship between a driving current and an emitted light amount). The value of the driving current for a target light amount P varies with temperature. The APC control discussed in Japanese Patent Application Laid-Open No. 2004-223716 can be performed in each scanning cycle or a plurality of scanning cycles to control the laser light to the target light amount even if the temperature of the semiconductor laser varies due to the emission of the laser light.

If a constant current continues to be supplied to a semiconductor laser for a relatively long period, the semiconductor laser itself causes self-heating. Some semiconductor lasers have a characteristic that the light amount of the laser light is attenuated due to self-heating after a start of the supply of the driving current and stabilizes after a lapse of certain time. Such a characteristic is commonly referred to as a droop characteristic of the semiconductor lasers. Some semiconductor lasers have a characteristic that the light amount of the laser light gradually increases due to self-heating after a start of the supply of the driving current and stabilizes after a lapse of certain time. Such a characteristic is commonly referred to as an inverse droop characteristic of the semiconductor lasers. Variations in the light amount of the laser light can cause uneven potentials of exposed portions formed on the photosensitive member, and as a result, the amount of toner adhering to the exposed portions becomes uneven. This leads to a drop in the image quality of the output image.

To correct such a droop characteristic or inverse droop characteristic, Japanese Patent Application Laid-Open No. 2012-40779 discusses an image forming apparatus that stores predetermined correction data in a memory in advance and corrects the driving current supplied to the semiconductor laser by using the correction data.

As illustrated in FIG. 8, the droop characteristic or inverse droop characteristic varies with temperature. More specifically, the amount of attenuation or the amount of gradual increase per unit time varies with the temperature of the semiconductor laser. The image forming apparatus that corrects the driving current supplied to the semiconductor laser by using the same correction data regardless of the temperature of the semiconductor laser therefore may fail to sufficiently correct the droop characteristic or the inverse droop characteristic, depending on the temperature of the semiconductor laser.

SUMMARY OF THE INVENTION

According to an aspect of the present invention, an image forming apparatus includes a photosensitive member, a light source configured to emit a light beam for exposing the photosensitive member to light when supplied with a driving current, a deflection unit configured to deflect the light beam such that the light beam scans the photosensitive member, an output unit configured to output data about temperature of the light source, a control unit configured to switch, in one scanning cycle of the light beam, between an electrostatic latent image forming mode in which the light source is configured to emit the light beam based on the image data, whereby an electrostatic latent image is formed on the photosensitive member, and a light amount control mode in which a light amount of the light beam is controlled in timing different from the electrostatic latent image forming mode, a light receiving unit configured to receive the light beam emitted from the light source, a setting unit configured to set a value of a current to be supplied to the light source such that a light amount received by the light receiving unit coincides with a target light amount, a first current supply unit configured to control a value of the driving current with reference to the value of the current set by the setting unit, and supply the driving current to the light source based on the image data, and a second current supply unit configured to supply a correction current to the light source in a state where the driving current is supplied from the first current supply unit to the light source, the correction current gradually increasing with an advance of time based on the data about the temperature of the light source output from the output unit and the value of the driving current controlled by the first current supply unit, so that the light amount of the light beam emitted by supply of the driving current is not attenuated with an advance of time.

Further features of the present invention will become apparent from the following description of exemplary embodiments with reference to the attached drawings.

BRIEF DESCRIPTION OF THE DRAWINGS

FIG. 6 is a timing chart illustrating control modes and on/off control of switches in one scanning cycle.

DESCRIPTION OF THE EMBODIMENTS

Image Forming Apparatus

Figure 1:
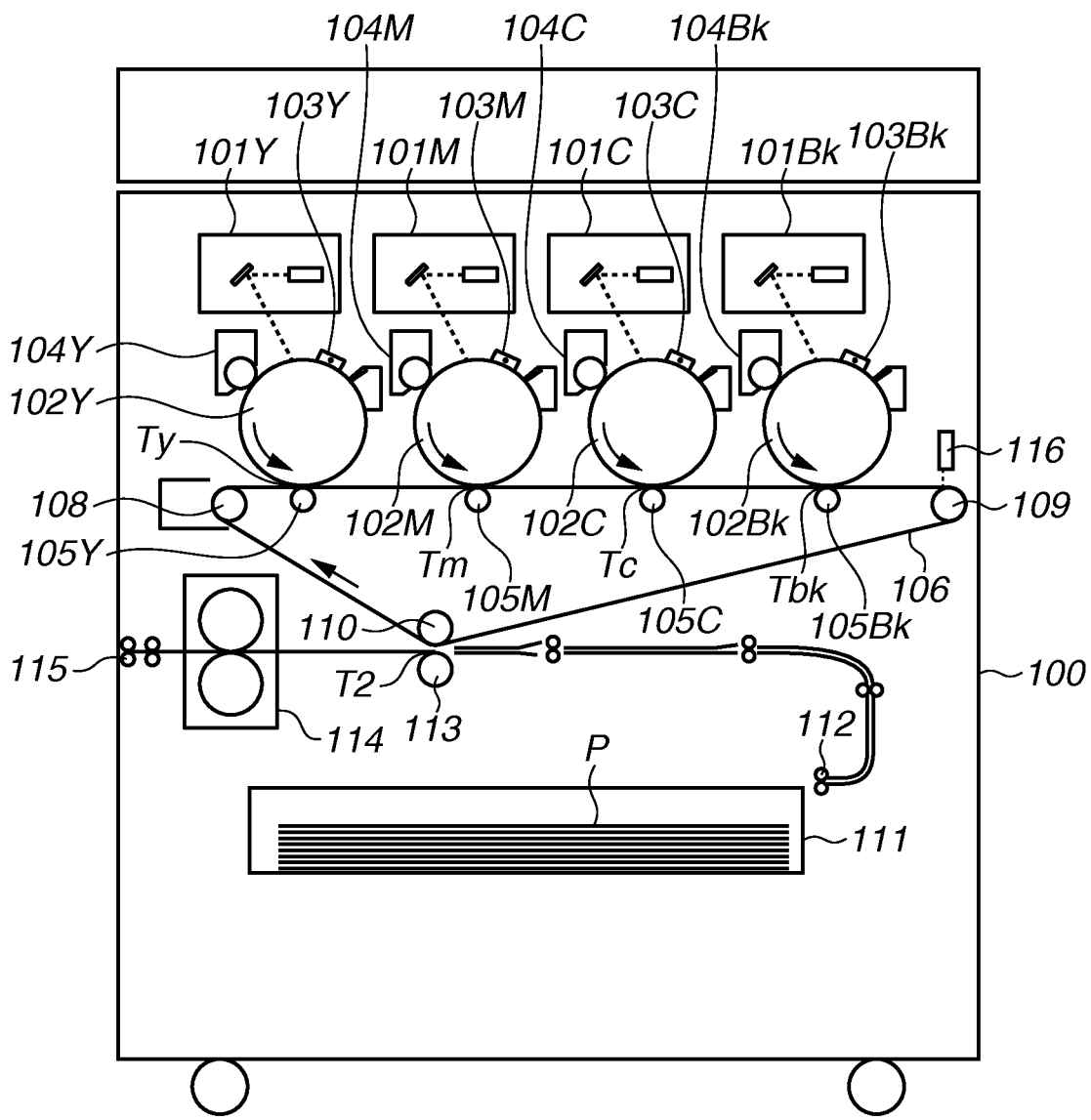
FIG. 1 is a schematic sectional view of an image forming apparatus according to an exemplary embodiment.

An exemplary embodiment of the present invention will be described below. An image forming apparatus according to the present exemplary embodiment will be initially described with reference to FIG. 1. FIG. 1 is a schematic sectional view illustrating an overall configuration of an electrophotographic color copying machine (hereinafter, referred to as an image forming apparatus 100) serving as the image forming apparatus. The image forming apparatus 100 includes optical scanning devices 101Y, 101M, 101C, and 101Bk, photosensitive drums 102Y, 102M, 102C, and 102Bk serving as photosensitive members, charging units 103Y, 103M, 103C, and 103Bk, and developing units 104Y, 104M, 104C, and 104Bk. Y represents yellow, M magenta, C cyan, and Bk black.

The image forming apparatus 100 also includes transfer rollers 105Y, 105M, 105C, and 105Bk serving as transfer devices, an intermediate transfer belt 106, and a transfer roller 113. The intermediate transfer belt 106 is stretched by a driving roller 108, a stretch roller 109, and a counter roller 110 which is opposed to the transfer roller 113.

The image forming apparatus 100 further includes a sheet cassette 111, a pickup roller 112, a fixing unit 114, and a discharge roller 115. The sheet cassette 111 contains recording media. The pickup roller 112 picks up a recording medium from the sheet cassette 111.

Next, an image forming process performed by the image forming apparatus 100 will be described. The photosensitive drum 102Y charged by the charging unit 103Y is exposed to laser light (light beam) which is emitted from the optical scanning device 101Y based on image data. The exposure of the photosensitive drum 102Y charged by the charging unit 103Y to the laser light forms an electrostatic latent image on the photosensitive drum 102Y. The developing unit 104Y develops the electrostatic latent image formed on the photosensitive drum 102Y by using yellow toner. The image forming processes of the other colors are similar to that of yellow. A description thereof is thus omitted.

Each of the toner images formed on the photosensitive drums 102Y, 102M, 102C, and 102Bk is transferred to the intermediate transfer belt 106 by the transfer rollers 105Y, 105M, 105C, and 105Bk in transfer portions Ty, Tm, Tc, and Tbk, respectively. A recording medium is picked up from the sheet cassette 111 by the pickup roller 112 and conveyed to a transfer portion T2. In the transfer portion T2, the toner images of the individual colors transferred to the intermediate transfer belt 106 are transferred to the recording medium by the transfer roller 113. The toner images transferred to the recording medium in the transfer portion T2 are heated and fixed to the recording medium by the fixing unit 114. The recording medium passed through the fixing unit 114 is discharged by the discharge roller 115.

<Optical Scanning Devices>

Next, the optical scanning devices 101Y, 101M, 101C, and 101Bk included in the image forming apparatus 100 will be described. The optical scanning devices 101Y, 101M, 101C, and 101Bk have the similar configuration. The present exemplary embodiment will thus be described by using the optical scanning device 101Y as an example.

Figure 2:
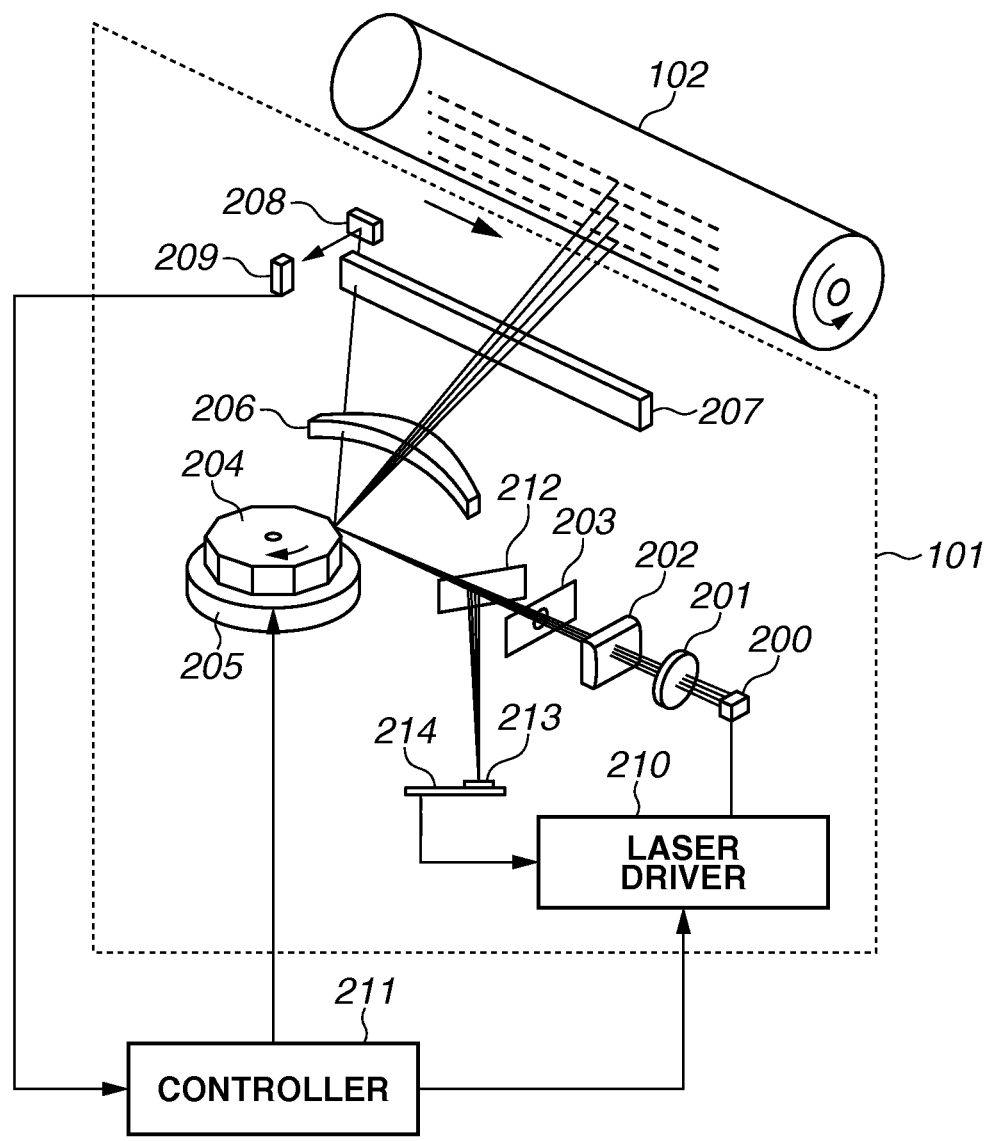
FIG. 2 is a diagram illustrating a schematic configuration of an optical scanning device and a controller according to the present exemplary embodiment.

FIG. 2 is a diagram illustrating a schematic configuration of the optical scanning device 101Y and a controller serving as a control unit that controls the optical scanning device 101Y. The optical scanning device 101Y includes a laser diode 200 (semiconductor laser) serving as a light source, a collimator lens 201, a cylindrical lens 202, an aperture stop 203, a beam splitter 212, a photodiode (PD) 213, a PD substrate 214, a polygonal mirror 204, a polygonal motor 205, an fθ lens 206, a reflecting mirror 207, a reflection mirror 208, a beam detector (BD) 209, and a laser driver 210.

The laser diode 200 includes a plurality of light emitting points for emitting laser light (light beam). For example, the laser diode 200 is a vertical cavity surface emitting laser. The light emitting points emit light based on image data from the controller 211. The plurality of light beams is passed through the collimator lens 201 to become parallel light beams. The cylindrical lens 202 has a refractive index only in a sub scanning direction (direction orthogonal to a direction in which the polygonal mirror 204 scans with the laser light (main scanning direction)). The cylindrical lens 202 condenses the parallel light beams in the sub scanning direction. The aperture stop 203 then stops down the laser light into a predetermined diameter in the main scanning direction before the laser light is split by the beam splitter 212. One of the laser light split by the beam splitter 212 is incident on the PD 213. The other laser light is incident on the polygonal mirror 204 (rotating polygonal mirror) serving as a deflection unit.

The PD 213 is mounted on the PD substrate 214. The PD 213 outputs a current having a value according to the light amount of the incident laser light (incident light amount). The current output from the PD 213 is converted into a voltage by a current-voltage (I-V) conversion circuit 415 arranged on the PD substrate 214 to be described below. The voltage is input to the laser driver 210. The laser driver 210 controls the values of currents supplied to the individual light emitting points of the laser diode 200 based on the input voltage so that the light amounts of the laser light emitted from the individual light emitting points coincide with a target light amount.

The polygonal motor 205 rotates the polygonal mirror 204 according to a control signal from the controller 211. A plurality of reflection surfaces of the polygonal mirror 204 driven to rotate deflects the incident laser light such that the laser light scans the photosensitive drum 102Y in the direction of the arrow in FIG. 2. The laser light deflected by the polygonal mirror 204 is passed through the fθ lens 206 and reflected by the reflecting mirror 207 before scanning the photosensitive drum 102Y.

The laser light deflected by the polygonal mirror 204 is incident on the reflection mirror 208 which is arranged to avoid a scanning area corresponding to an image area on the photosensitive drum 102Y. The BD 209 is scanned with laser light reflected by the reflection mirror 208. The BD 209 is scanned with the laser light to output a synchronization signal (hereinafter, BD signal). The BD signal is used to synchronize the rotation of the polygonal mirror 204 with image write start timing. Based on the generation timing of the BD signal, the controller 211 controls output timing of image data so as to control an image write position in the main scanning direction. Based on the generation cycles of the BD signal, the controller 211 also controls the polygonal motor 205 such that a rotation speed of the polygonal mirror 204 coincides with a target rotation speed.

(Controller and Laser Driver)

Figure 3:
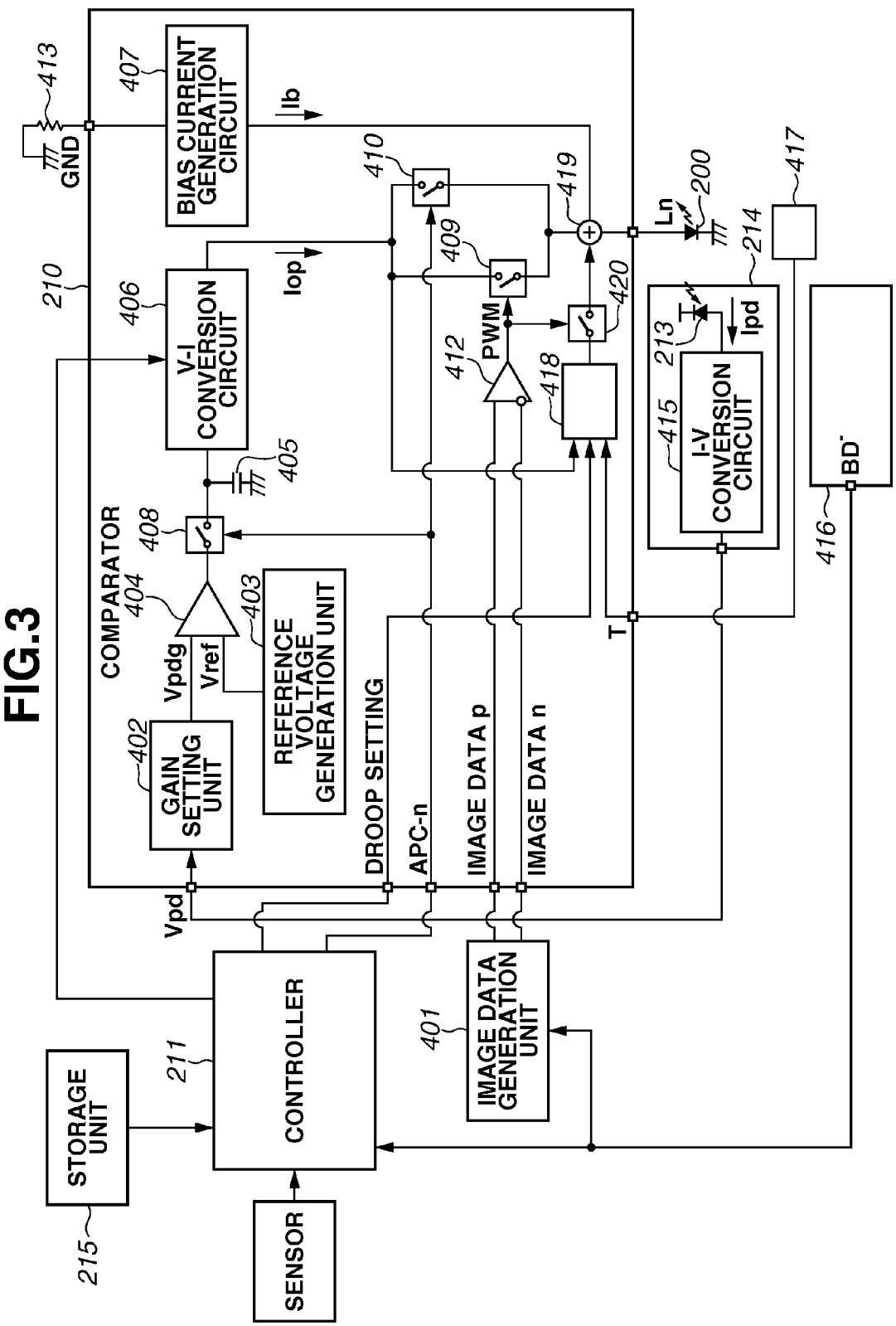
FIG. 3 is a control block diagram according to the present exemplary embodiment.

Next, a control block diagram of the image forming apparatus 100 according to the present exemplary embodiment will be described. FIG. 3 is a control block diagram of the laser driver 210 for driving the laser diode 200, and the controller 211. For simplicity of description, the control block diagram illustrates the laser diode 200 to have only one light emitting point Ln. In practice, the laser diode 200 has n light emitting points (n is a natural number).

As described in FIG. 2, the image forming apparatus 100 according to the present exemplary embodiment includes the PD 213. The PD 213 outputs a detection current Ipd having a value according to a received light amount (incident light amount). The detection current Ipd is input to the I-V conversion circuit 415 which is mounted on the PD substrate 214. The I-V conversion circuit 415 outputs a detection voltage Vpd according to the value of the detection current Ipd.

The controller 211 outputs an APC execution instruction signal APC-n for controlling the light emitting point Ln in an APC mode. In a video mode to be described below, an image data generation unit 401 outputs image data p and image data n to the laser driver 210 at timing based on the BD signal. The image data p and the image data n are differential signals.

The controller 211 outputs APC execution signals APC-n corresponding to the individual light emitting points Ln. The controller 211 outputs a high level of APC execution instruction signal APC-n corresponding to any one of the n light emitting points (hereinafter, may also be referred to as light emitting elements) Ln in a preprogrammed APC execution period in one scanning cycle or a plurality of scanning cycles. While outputting a high level of APC execution instruction signal APC-n corresponding to any one of the n light emitting elements Ln, the controller 211 sets the APC execution instruction signals APC-n corresponding to the other (n−1) light emitting points Ln to a low level. The APC execution instruction signals APC-n are signals for controlling on/off of a switch SW 408 and a switch SW 410 to be described below. The high level of APC execution instruction signals APC-n turn on the switches SW 408 and 410.

Next, an internal configuration of the laser driver 210 will be described. The laser driver 210 includes an amplifier 402 (gain setting unit), a reference voltage generation unit 403, a comparator 404, an APC sample-and-hold capacitor 405, a voltage-current conversion circuit 406, a bias current generation circuit 407, the switch SW 408, a switch SW 409, the switch SW 410, and a droop correction unit 418.

The detection voltage Vpd is input from the I-V conversion circuit 415 to the amplifier 402. The amplifier 402 outputs Vpdg that is obtained by amplifying the value of Vpd according to a gain value set at the time of factory adjustment.

The comparator 404 includes two input terminals and one output terminal. Vpdg is input to one of the input terminals. A reference voltage Vref that is output from the reference voltage generation unit 403 is input to the other input terminal. The reference voltage Vref is a voltage having a constant value corresponding to the target light amount of the laser light emitted from the light emitting point Ln. The comparator 404 compares Vpdg and Vref.

If the comparison result of the comparator 404 is $$Vpdg < Vref, \quad (\text{Eq. 1})$$

the comparator 404 outputs a current according to the difference therebetween from the output terminal.

If the comparison result of the comparator 404 is $$Vpdg > Vref, \quad (\text{Eq. 2})$$

the comparator 404 takes in a current according to the difference therebetween from the output terminal.

If the comparison result of the comparator 404 is $$Vpdg = Vref, \quad (\text{Eq. 3})$$

the comparator 404 does not output or take in a current.

The output terminal of the comparator 404 is connected to one terminal of the switch SW 408. As illustrated in FIG. 3, the other terminal of the switch SW 408 is connected with the APC sample-and-hold capacitor 405 and the voltage-current conversion circuit 406 (V-I conversion circuit).

The switch SW 408 connects the two terminals if the APC execution instruction signal APC-n transmitted from the controller 211 is high. The switch SW 408 disconnects the two terminals if the APC execution instruction signal APC-n is low.

If the APC execution instruction signal APC-n is high and Vpdg<Vref (Eq. 1), the APC sample-and-hold capacitor 405 is charged with the current output from the comparator 404, and a voltage Vch of the APC sample-and-hold capacitor 405 rises. If the APC execution instruction signal APC-n is high and Vpdg>Vref (Eq. 2), the comparator 404 takes in the current to discharge the APC sample-and-hold capacitor 405, and the voltage Vch falls. If the APC execution instruction signal APC-n is high and Vpdg=Vref (Eq. 3), the voltage Vch is maintained.

The V-I conversion circuit 406 (first current supply unit) outputs a driving current Iop having a value based on the voltage Vch and a light amount control signal from the controller 211. More specifically, the V-I conversion circuit 406 outputs the driving current Iop having a value based on Vchg that has been obtained by performing a gain adjustment based on the light amount control signal with reference to the voltage Vch.

The image data generation unit 401 generates the differential signals p and n of image data based on a print job from a user. The image data generation unit 401 outputs the differential signals p and n of the image data with reference to the timing of generation of the BD signal output by the BD 209.

The differential signals p and n are input to a conversion circuit 412. The conversion circuit 412 generates a pulse width modulation (PWM) signal based on the differential signals p and n. The PWM signal output by the conversion circuit 412 is used to control on/off of the switch SW 409 and a switch SW 420 More specifically, if the PWM signal is high, the switches SW 409 and 420 are turned on. If the PWM signal is low, the switches SW 409 and 420 are turned off.

The controller 211 outputs the low level of APC execution instruction signal APC-n in one scanning cycle so that the light emitting element Ln emits laser light to scan the photosensitive drum 102 based on the image data. The controller 211 outputs the low level of APC execution instruction signal APC-n, whereby the switches SW 408 and 410 are turned off.

That is, when the light emitting element Ln radiates the laser light to scan the photosensitive drum 102 based on the image data, the controller 211 controls the switches so that the driving current Iop is passed through the switch SW 409 and input to an adder 419.

The adder 419 is connected with the bias current generation unit 407. The bias current generation circuit 407 generates a bias current Ib having a value based on the resistance value of a bias current setting resistor 413 which is connected outside. To improve light emission response when the driving current Iop is supplied to the light emitting element Ln, the bias current Ib is supplied to the light emitting element Ln at least during image formation regardless of whether the PWM signal is high or low.

While the bias current Ib is being supplied to the light emitting element Ln via the adder 419, if the conversion circuit 412 outputs a high level PWM signal, the switch SW 409 is turned on and the driving current Iop and the bias current Ib are supplied to the light emitting element Ln via the adder 419. As a result, the light emitting element Ln radiates laser light generated by stimulated emission. The laser light radiated from the light emitting element Ln is guided to the photosensitive drum 102 by the configuration described above.

The laser driver 210 includes the droop correction unit 418 (second current supply unit). The droop correction unit 418 outputs a correction current Icor for correcting a light amount variation (an attenuation or a gradual increase in the light amount with an advance of time) based on a droop characteristic of the light emitting element Ln when the driving current Iop is supplied. The switch SW 420 is arranged between the droop correction unit 418 and the adder 419. The switch 420 is controlled by on/off of the PWM signal output from the conversion circuit 412. If the PWM signal is high, the switch SW 420 is turned on. If the PWM signal is low, the switch SW 420 is turned off. In other words, if the switch SW 409 is on, the switch SW 420 is turned on. If the switch SW 409 is off, the switch SW 420 is turned off. The correction current Icor is thus supplied while the driving current Iop is supplied.

The laser driver 210 includes a register, in which the following computing equation is set:

$$IAmax\_drp = -(C \times T - Ao) \times (Iop - Idpo)^2 \exp(-t/L),\qquad\text{(Eq. 4)}$$

where C is a temperature coefficient, Ao is a temperature offset, Idpo is a current parameter indicating a threshold current at which a droop begins, and L is a time constant of the droop. Such values are correction coefficients inherent to the light emitting element Ln, calculated based on the droop characteristic of the light emitting element Ln measured in the factory. The correction coefficients are stored in a storage unit 215.

The controller 211 transmits data about the correction coefficients to the droop correction unit 418 when the image forming apparatus 100 is powered on. The droop correction unit 418 substitutes the transmitted correction coefficients into Eq. 4.

The image forming apparatus 100 according to the present exemplary embodiment includes a temperature information output unit 417 (output unit) which outputs information (data) about a temperature of the light emitting element Ln. Examples of the temperature information output unit 417 include a thermistor attached to the laser diode 200, a thermistor arranged near the laser diode 200, and a thermistor arranged in a housing of the optical scanning device 101. The temperature information output unit 417 may be a detection element that is arranged inside a package of the semiconductor laser including the light emitting element Ln and of which an output voltage changes with the temperature of the semiconductor laser when a current is passed. In any mode of embodiment of the temperature information output unit 417, the temperature information output unit 417 outputs data about the temperature of the laser diode 200 including the light emitting element Ln. The temperature information output unit 417 outputs data T (temperature information) about the detected temperature to the droop correction unit 418.

Meanwhile, the driving current Iop output from the voltage-current conversion circuit 406 is input to the droop correction unit 418.

The droop correction unit 418 substitutes the data T about the temperature and the driving current Iop into Eq. 4.

With such processing, the droop correction unit 418 generates the correction current Icor for suppressing the attenuation in the light amount of the laser light emitted from the light emitting element Ln by the supply of the driving current Iop with an advance of time.

Figure 4A:
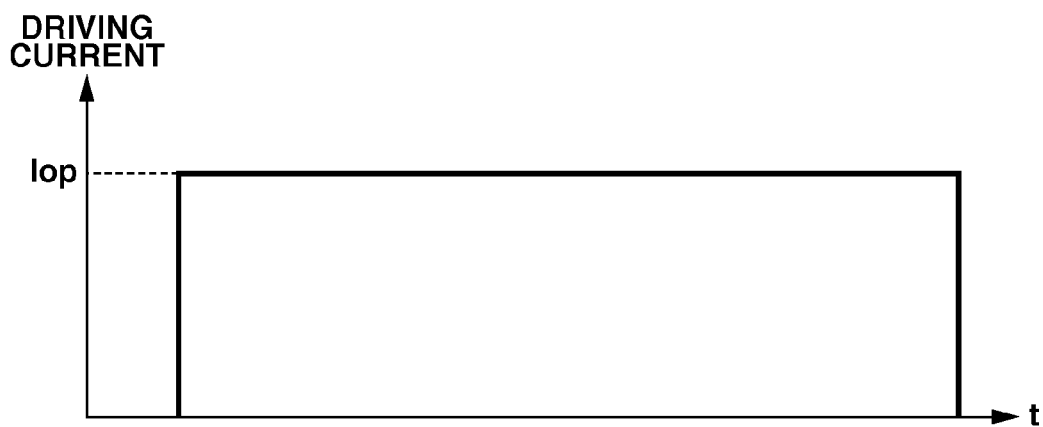
FIGS. 4A and 4B are charts illustrating a droop characteristic of a comparative example for the present exemplary embodiment.
Figure 4B:
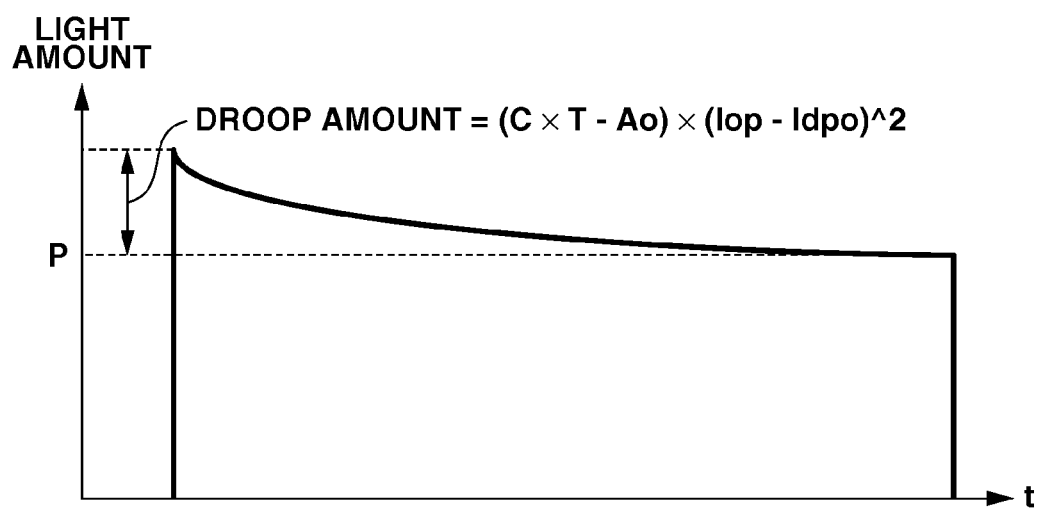
Figure 5A:
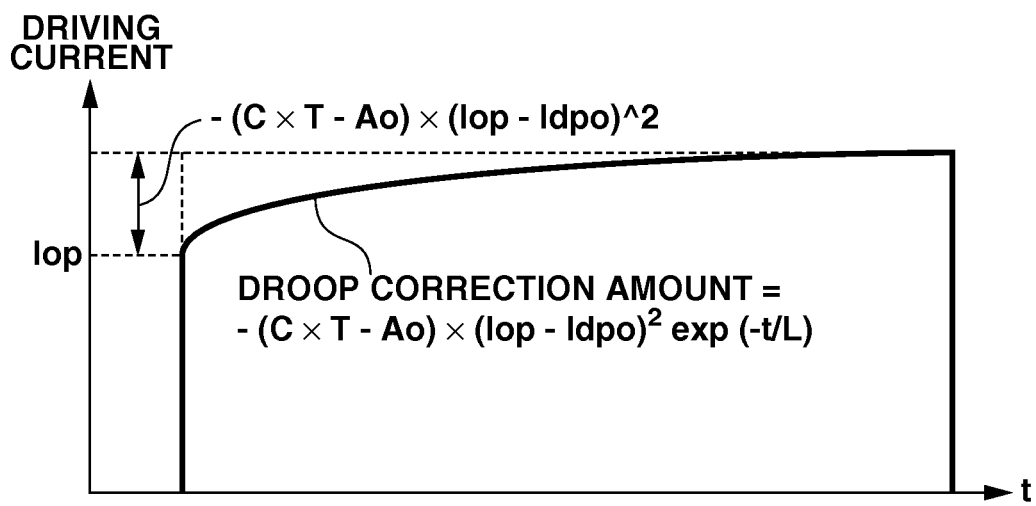
FIGS. 5A and 5B are charts illustrating an effect of the image forming apparatus according to the present exemplary embodiment, compared to FIGS. 4A and 4B.
Figure 5B:
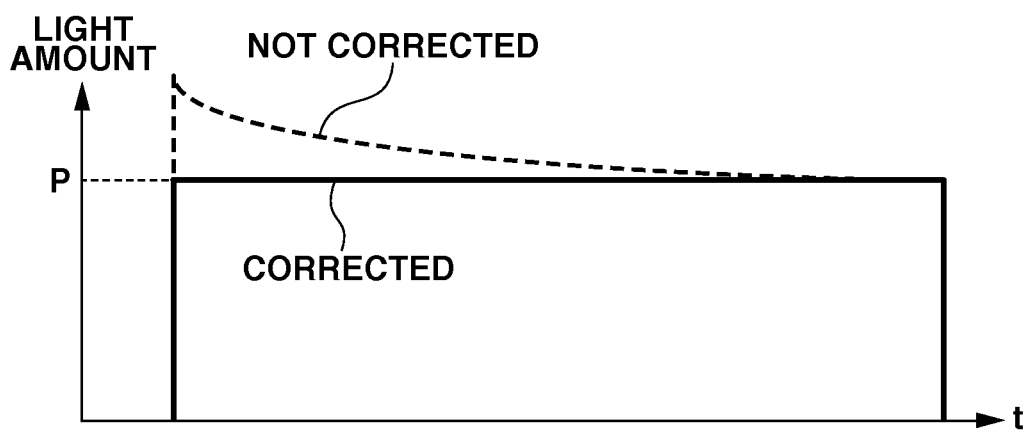
Figure 7:
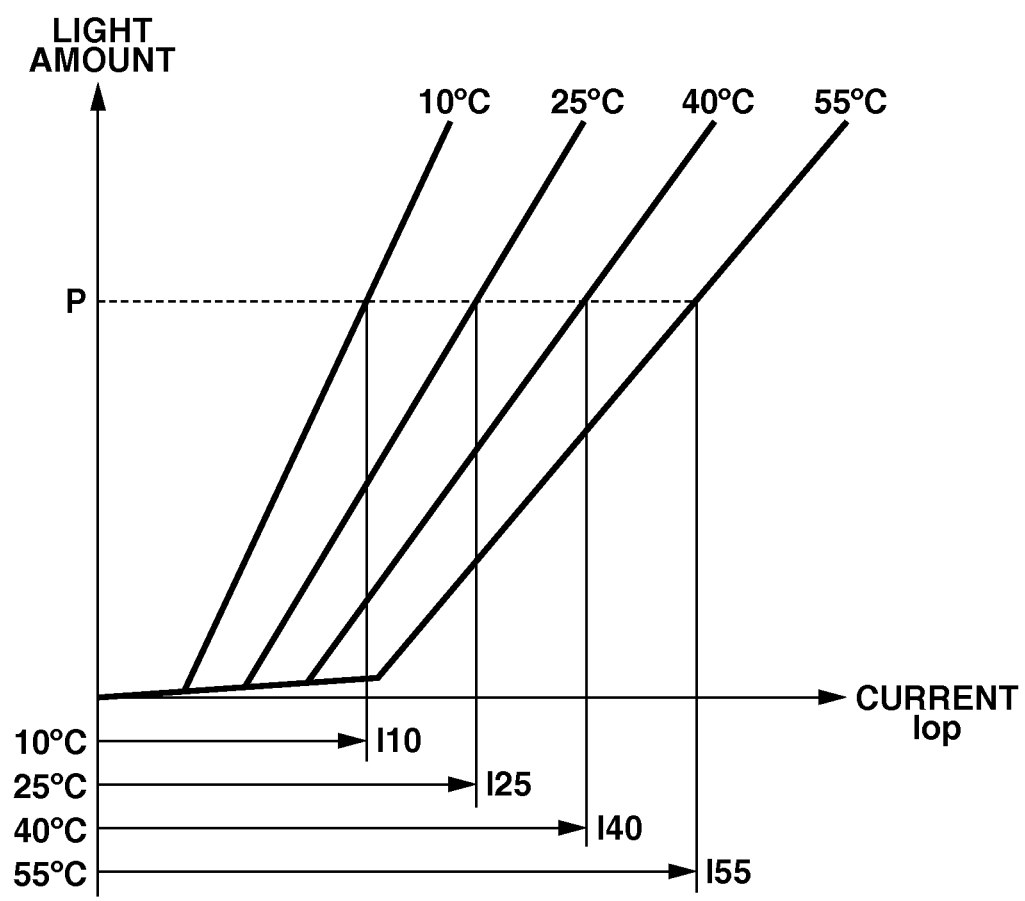
FIG. 7 is a chart illustrating a temperature characteristic of a light emitting element.
Figure 8:
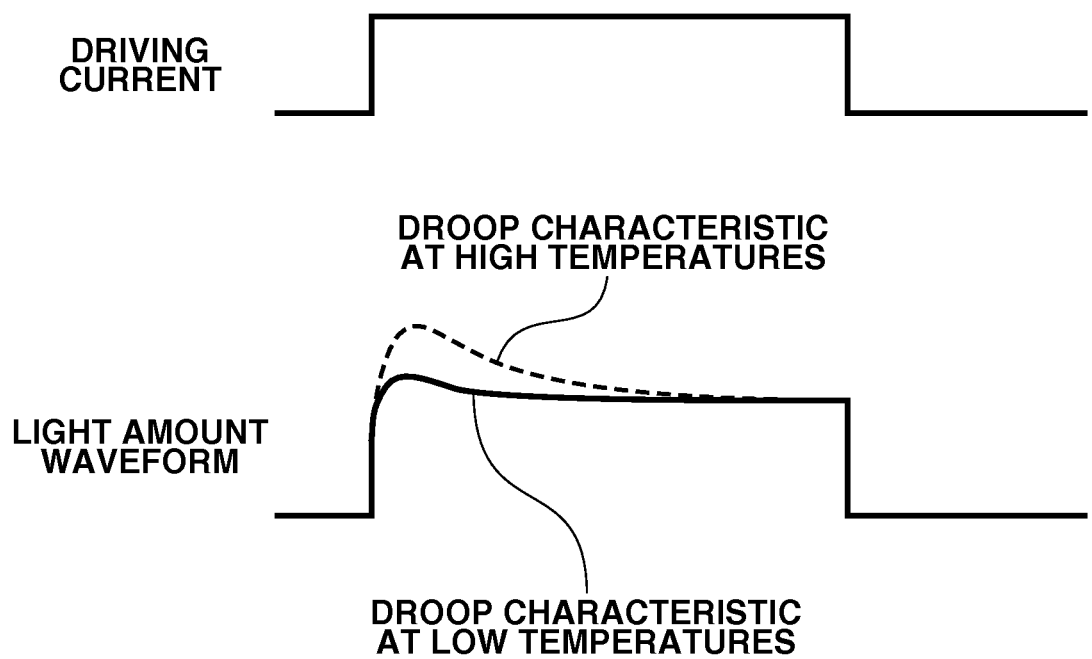
FIG. 8 is a diagram illustrating a droop characteristic.

FIGS. 5A and 5B are charts illustrating a relationship between the current supplied to the light emitting element Ln of the image forming apparatus 100 according to the present exemplary embodiment and the light amount of the laser light. FIGS. 4A and 4B illustrate a comparative example of the relationship between the current supplied to a light emitting element Ln of an image forming apparatus that does not include the unit for generating the correction current Icor and the light amount of the laser light. FIG. 6 is a timing chart illustrating control modes and on/off control of switches in one scanning cycle.

In any of FIGS. 4A, 4B, 5A, and 5B, the horizontal axes indicate time. In FIGS. 4A and 5A, the vertical axes indicate the value of the driving current Iop. In FIGS. 4B and 5B, the vertical axes indicate the value of the light amount. For simplicity of description, the specific current values of the bias current Ib are omitted from FIGS. 4A, 4B, 5A, and 5B. While the droop characteristic in which the light amount of the laser light attenuates is described as an example with reference to FIGS. 4A, 4B, 5A, and 5B, the correction may also be applicable to an inverse droop characteristic in which the light amount of the laser light gradually increases.

As illustrated in FIG. 6, if the control mode is the APC mode (light amount control mode), the switches SW 408 and 410 are turned on and the value of the driving current Iop is controlled based on the output result of the PD 213. After an off mode period has passed, the control mode shifts to the video mode. The video mode (electrostatic latent image forming mode) is a mode in which the switches SW 409 and 420 are controlled to be on/off according to the PWM signal generated based on the image data p and n. In the period of the video mode, the switch SW 409 is turned on according to a high level PWM signal, whereby the driving current Iop is supplied and the laser light is emitted from the light emitting element Ln to scan the photosensitive drum 102.

As illustrated in FIG. 4A, if the switch SW 409 is turned on based on the high level PWM signal and the driving current Iop is supplied to the light emitting element Ln, the light amount of the laser light emitted from the light emitting element Ln of the image forming apparatus that does not include the unit for generating the correction current Icor attenuates with an advance of time (see FIG. 4B). The amount of attenuation per unit time and the time constant depend on each light emitting element Ln and the temperature of the light emitting element Ln (laser light source).

The droop correction unit 418 according to the present exemplary embodiment then outputs the correction current Icor to the adder 419 via the switch SW 420 which is turned on according to the high level PWM signal. As illustrated in FIG. 5A, the correction current Icor is based on Eq. 4 and the correction coefficients. The adder 419 adds the driving current Iop, the bias current Ib, and the correction current Icor, and supplies the resultant to the light emitting element Ln.

As illustrated in FIG. 5B, the light amount waveform corrected by the supply of the correction current Icor comes closer to a constant value than the not-corrected light amount waveform. As described above, the correction coefficients can be changed to change the tendency (degree) of attenuation. Since Eq. 4 includes the temperature coefficient C, the tendency of attenuation can be changed according to the detected temperature.

As has been described above, the image forming apparatus 100 according to the present exemplary embodiment can change the tendency of attenuation or the tendency of gradual increase of the correction current Icor according to the detected temperature. This enables a droop correction of the emitted light amount or a correction of the inverse droop characteristic according to temperature variations.

The correction current Icor for correcting the droop characteristic or inverse droop characteristic can be changed according to data indicating the temperature of the semiconductor laser, whereby variations (attenuation or gradual increase) of the emitted light amount as time advances can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-107037, filed May 23, 2014, which is hereby incorporated by reference herein in its entirety.

What is claimed is:

1. An image forming apparatus comprising:
a photosensitive member;
a light source configured to emit a light beam for exposing the photosensitive member to light when supplied with a driving current;
a deflection unit configured to deflect the light beam such that the light beam scans the photosensitive member;
an output unit configured to output data about temperature of the light source;
a control unit configured to switch, in one scanning cycle of the light beam, between an electrostatic latent image forming mode in which the light source is configured to emit the light beam based on the image data, whereby an electrostatic latent image is formed on the photosensitive member, and a light amount control mode in which a light amount of the light beam is controlled in timing different from the electrostatic latent image forming mode;
a light receiving unit configured to receive the light beam emitted from the light source;
a setting unit configured to set a value of a current to be supplied to the light source such that a light amount received by the light receiving unit coincides with a target light amount;
a first current supply unit configured to control a value of the driving current with reference to the value of the current set by the setting unit, and supply the driving current to the light source based on the image data; and
a second current supply unit configured to supply a correction current to the light source in a state where the driving current is supplied from the first current supply unit to the light source, the correction current gradually increasing with an advance of time based on the data about the temperature of the light source output from the output unit and the value of the driving current controlled by the first current supply unit, so that the light amount of the light beam emitted by supply of the driving current is not attenuated with an advance of time.

2. The image forming apparatus according to claim 1, further comprising:
a data generation unit configured to generate a PWM signal for controlling on/off of a switch based on the image data;
a first switch configured to be turned on/off according to the PWM signal, the first switch being arranged between the first current supply unit and the light source; and
a second switch configured to be turned on/off according to the PWM signal, the second switch being arranged between the second current supply unit and the light source,
wherein the second switch is turned on in a state where the first switch is turned on by the PWM signal.

3. The image forming apparatus according to claim 1, wherein the output unit is a thermistor configured to detect the temperature of the light source.

4. The image forming apparatus according to claim 1, wherein the light source includes a plurality of light emitting elements configured to emit a light beam, and
wherein the output unit is a detection element of which an output voltage changes with the temperature of the light source when a current is passed, the detection element being arranged in a package including the plurality of light emitting elements of the light source.

5. An image forming apparatus comprising:
a photosensitive member;
a light source configured to emit a light beam to expose the photosensitive member to light when supplied with a driving current;
a deflection unit configured to deflect the light beam such that the photosensitive member is scanned with the light beam;
an output unit configured to output data about temperature of the light source;
a control unit configured to switch, in one scanning cycle of the light beam, between an electrostatic latent image forming mode in which the light source is configured to emit the light beam based on the image data, whereby an electrostatic latent image is formed on the photosensitive member, and a light amount control mode in which a light amount of the light beam is controlled in timing different from the electrostatic latent image forming mode;
a light receiving unit configured to receive the light beam emitted from the light source;
a setting unit configured to set a value of a current to be supplied to the light source such that a received light amount of the light receiving unit coincides with a target light amount;
a first current supply unit configured to control a value of the driving current with reference to the value of the current set by the setting unit, and supply the driving current to the light source based on the image data; and
a second current supply unit configured to control the light beam to be emitted in a second light amount by supplying a correction current to the light source in a state where the driving current is supplied to the light source, the second current supply unit supplying the correction current to the light source in a state where the driving current is supplied from the first current supply unit to the light source, the correction current attenuating with an advance of time based on the data about the temperature of the light source output from the output unit and the value of the driving current controlled by the first current supply unit, so that the light amount of the light beam emitted by supply of the driving current does not gradually increase with an advance of time.

6. The image forming apparatus according to claim 5, further comprising:
a data generation unit configured to generate a PWM signal for controlling on/off of a switch based on the image data;
a first switch configured to be turned on/off according to the PWM signal, the first switch being arranged between the first current supply unit and the light source; and
a second switch configured to be turned on/off according to the PWM signal, the second switch being arranged between the second current supply unit and the light source,
wherein the second switch is turned on in a state where the first switch is turned on by the PWM signal.

7. The image forming apparatus according to claim 5, wherein the output unit is a thermistor configured to detect the temperature of the light source.

8. The image forming apparatus according to claim 5, wherein the light source includes a plurality of light emitting elements configured to emit a light beam, and
wherein the output unit is a detection element of which an output voltage changes according to the temperature of the light source when a current is passed, the detection element being arranged in a package including the plurality of light emitting elements of the light source.

* * * * *